United States Patent [19]

Dunn, Jr. et al.

[11] Patent Number: 5,004,500

[45] Date of Patent: Apr. 2, 1991

[54] CHLORINATION PROCESS FOR RECOVERING GOLD VALUES FROM GOLD ALLOYS

[75] Inventors: Wendell E. Dunn, Jr., Spearfish; Dan D. Carda, Rapid City; Timothy A. Storbeck, Spearfish, all of S. Dak.

[73] Assignee: Auric-Chlor, Inc., Rapid City, S. Dak.

[21] Appl. No.: 310,233

[22] Filed: Feb. 13, 1989

[51] Int. Cl.$^5$ .............................................. C22B 11/06
[52] U.S. Cl. ........................................ 75/422; 75/423
[58] Field of Search ............. 75/100, 112, 113, 118 R, 75/422, 423

[56] References Cited

U.S. PATENT DOCUMENTS 3,998,926 12/1976 Oliver et al. ............................ 75/83
4,086,084 4/1978 Oliver et al. .......................... 75/113
4,145,187 3/1979 Oliver et al. .......................... 75/113

Primary Examiner—Melvyn J. Andrews
Attorney, Agent, or Firm—Merchant, Gould, Smith, Edell, Welter & Schmidt

[57] ABSTRACT

A process for the recovery of precious metal values as essentially pure gold from gold alloys in the form of thin strips 0.05 to 0.25 inch thick having a gold content of up to 80% gold comprising chlorinating the strips at a temperature of 300 to 700 degrees Centigrade to form a metallic gold/metal chloride mixture and removing the metal chlorides from the gold in the mixture using an aqueous wash. When silver is part of the alloying metal, essentially pure silver is recovered by first washing the metallic gold/metal chloride mixture with hydrochloric acid and then with ammonium hydroxide and recovering the silver from the ammonium hydroxide.

11 Claims, No Drawings

CHLORINATION PROCESS FOR RECOVERING GOLD VALUES FROM GOLD ALLOYS

FIELD OF THE INVENTION

This invention relates to a process for recovering gold from gold alloys and, more particularly, to a chlorination method for recovering pure gold from gold alloys.

BACKGROUND OF THE INVENTION

The prior art methods of reclaiming gold values from jewelry and electronic scrap and doré involves dissolution of the gold and alloying metals and subsequent reduction of the gold-containing solution to obtain metallic gold. Dissolution of gold scrap produces large quantities of waste solutions especially when cyanide is used. Current EPA regulation requires treatment of these waste solutions prior to disposal which is both expensive and time consuming. We have invented a process for purifying gold scrap to produce very high purity gold which does not involve the use of cyanide nor the dissolution of the gold in the scrap and doré. In our process, alloying metals are stripped away from the gold using a moderately high temperature chlorination. The alloying metals are converted into metal chlorides which can be removed by dissolution in water, dilute hydrochloric acid and ammonium hydroxide and traces of silver are removed using a final nitric acid wash.

The process of this invention can be used to obtain high purity gold from doré, the impure gold obtained as an intermediate gold product in the recovery of gold from gold containing ores. The process provides a method of separating and recovering both gold and silver values when silver is the alloying metal or part of alloying metals in the gold alloy being purified.

SUMMARY OF THE INVENTION

This invention is directed to a vapor phase chlorination process for treating gold alloy in the form of a strip, preferably having a thickness of 0.01 to 0.22 inch to produce high purity gold in the range of 99.9 to 99.999 percent which comprises reacting chlorine gas and the gold alloy strip at moderately high temperatures, e.g., in the range of 350 to 700 degrees Centigrade to convert alloying metal present in the gold to a metal chloride and thereafter washing the purified gold remaining, alternately, with water, hydrochloric acid using air agitation, ammonium hydroxide, and nitric acid to remove the metal chlorides and a small amount of silver remaining in the gold or on the surface of the gold.

The gold produced by this process when jewelry gold scrap is used has a purity of about 99.95 to 99.99 percent gold and is thus considered to be gold with a fineness of 999.5 to 999.9. The gold produced can have a gold content of up to 99.999%.

The purified gold can be used the same as gold purified by conventional methods, for example, in the manufacture of jewelry, coins, bullion and for electronic contract points.

DESCRIPTION OF THE PREFERRED EMBODIMENTS

Our process comprises recovering essentially pure gold from gold alloys by reacting the gold alloys converted to thin strips having a thickness of 0.01 to 0.3 inch or higher and preferably 0.05 to 0.25 inch with chlorine at a temperature of 300 to 700 degrees Centigrade and preferably 350 to 650 degrees Centigrade.

The gold alloy can contain a variety of metals which react with chlorine at the temperatures used in this process such as silver, copper, zinc, aluminum, manganese, tin, and other metals commonly used to make gold alloys. Platinum does not react with chlorine under the conditions used in our process. Generally, the source of the gold raw material is dore and scrap gold from old jewelry, jewelry manufacture scrap and electronic gold scrap. The amount of alloying metal in the gold alloy being purified can be 5 to 10 percent, by weight, or higher and preferably is 25 to 80 percent, by weight, and most preferred is 25 to 75 percent by weight. When electronic scrap having a gold content of 80 percent or higher or doré having a gold content of about 80 percent, by weight, or higher is being purified in the process, it is preferable to convert the scrap and doré are converted to an alloy with a higher amount of alloying metal content by melting the doré or scrap and adding to the melt the desired amount of an alloying metal in an amount to increase the alloying metal content to about 50 percent, by weight. The resulting alloy is cast into bars which can be into strips of the desired thickness. Similarly, gold jewelry and electronic flake, and powder scrap can be melted and, if desired, an alloying metal added prior to the alloy being cast into bars which can be rolled into the strips used in our process.

It is believed that the rate of reaction of chlorine with the alloying metals present in the scrap and doré is acceptable when the alloying metal is present at a concentration of more than 5 to 10 percent, by weight, and preferably 30 to 80 percent. The rate of chlorination is sufficiently high that the chlorination can be completed in 6 to 8 hours. Concentrations of the alloying metal substantially below 5 to 10 percent, by weight, for example, 2.5 percent by weight or less, result in a much slower rate of reaction at the temperatures used in my process.

The temperatures used in the process have been selected to be where little, if any, of the gold in the gold alloy being purified is attacked by the chlorine to form gold chloride. Chlorine reacts with gold at temperature up to about 300 degrees centigrade to form gold monochloride and above about 700 degrees centigrade to form gold trichloride. Our process is conducted at a temperature of about 300 to 700 degrees Centigrade so that only very small amounts of gold, if any, is converted to gold chloride during the process.

The strips remaining after chlorination are washed with hydrochloric acid preferably using air or oxygen sparging to remove copper chloride and convert cuprous chloride formed during the chlorination step to cupric chloride, and to remove other water soluble chlorides. Silver chloride is removed from the strips using an ammonia/water mixture as the next washing step. A final wash using nitric acid is used to remove traces of silver remaining in the gold or on the surface of the gold.

After processing, the strips are converted into a porous friable strip and flake which easily breaks into small pieces. Some of the strips have lost structural strength to such a degree that the strips fold over under their own weight. A portion of the strips may disintegrate into gold fines which can be recovered from molten metal chlorides which have drained from the gold during the chlorination step. The gold remaining from scrap jewelry is of a high purity, e.g, 99.90 to 99.999% gold. Doré, depending upon the ore from which it is derived, may contain platinum as an impurity. Platinum does not react with chlorine under the conditions used in the process of this invention. The purity of gold/platinum derived from platinum containing doré expressed as gold is 99.90 to 99.99 percent.

The reaction of chlorine with alloying metal is exothermic. Sufficient heat is produced during the initial stage of the chlorination process that external heat to the reactor can be eliminated or minimized. Therefore, in order to control the temperature during the chlorination step, which generally requires 4 to 8 hours to perform, it is necessary to limit the supply of chlorine during the initial 1 to 2 hours of the process. During the initial stage of the reaction, e.g., during the first 1 to 2 hours of purifying 3600 dwt. of gold strips with chlorine, the rate of flow of chlorine is 2.5 to 5.0 mmols/sec. The rate of flow of chlorine is increased during the next 2 hours of process to 5 to 10 mmols/sec. During the last 1 to 2 hours of the process, the flow of chlorine can be increased considerably to a rate of about 10 to 15 mmols/sec. The rate of chlorination is dependent upon surface area of the gold alloy and, therefore, lower flow rates of chlorine are used when very thin strips of gold alloy are being purified. External heat is supplied a needed during the later part chlorination step to maintain the desired process temperature.

The reactor used to purify gold can be constructed a silica tubular reactor or a reactor constructed of a chlorine and molten metal chloride resistant metal or alloy. The dimensions of the reactor will be dependent upon the amount of gold alloy being purified. In general, 3000 to 4000 dwt. of gold alloy in the form of strips having the dimensions $0.1'' \times 2'' \times 9''$ can be purified in a silica tubular reactor having an internal diameter of 10 inches and a length of two feet. The strips are vertically disposed in the reactor. Space is provided below the strips to collect molten metal chlorides which drain from the strips.

The reactor can be equipped with a porous plate to hold the strips. Chlorine gas is introduced into the reactor preferably into the bottom of the reactor. During the reaction, some of the metal chlorides which are formed melt and drain from the purified gold and collect in the bottom of the reactor or below the porous plate.

The purified gold is washed with 2 to 20 percent hydrochloric acid preferably with air sparging to remove water soluble metal chlorides such as copper chloride and zinc chloride. Preferably, the hydrochloride acid wash uses 2 to 10 percent hydrochloric acid. The gold is then washed with ammonium hydroxide to remove silver chloride. The concentration of the ammonium hydroxide is 8 to 26 Baumé. The gold can be treated with concentrated nitric acid to remove any metallic silver. The concentration of the nitric acid used is 10 to 50 percent. The gold is finally washed with water and dried. The gold can be melted under a flux and cast into bars. The yield of gold values by our process is generally 99.9%.

The wash solutions containing the metal chlorides are separated from each other. The separate washes can be treated to remove the metals present prior to disposal. Copper can be recovered from the hydrochloric acid wash and silver can be recovered from the ammonium hydroxide wash by electrolyzing each of said wash to form metallic copper and silver.

EXAMPLE 1

A 14K yellow gold sample of 12 strips about 9 inches in length, 1 to 3.5 inches wide and 0.1 inch thick was suspended in a 10 inch internal diameter silica tubular reactor having a length of 2 feet. The top and bottom of the reactor was made of graphite. Chlorine gas was introduced into the reactor from the bottom. The reactor was heated by a clam shell electric heater. Each half of the heater was capable of producing 4800 watts at full voltage. The temperature in the reactor was raised to 305 degrees Centigrade and then chlorine introduced into the reactor at a rate of 2.5 mmols/sec. After 30 minutes, the flow of chlorine was increased to 5 mmols/sec. The temperature in the reactor increased to 514 degrees Centigrade at which time the flow rate was adjusted to 10 mmols/sec. Total time elapsed was 1.67 hours. The flow rate of chlorine was maintained at 10 to 12 mmols/sec. during which time the temperature within the reactor was maintained at 514 to 611 degrees Centigrade. After about an hour the chlorine flow rate was decreased to 5 mmols/sec. for about 30 minutes then to 0.63 mmols/sec. The temperature in the reactor was maintained at 500 degrees Centigrade for about 37 minutes then the power was shut off to the heaters. Chlorine was continually introduced for 37 minutes after power to the heaters was shut off.

The strips were removed when the reactor was cool and metal chlorides which had drained into the bottom of the reactor below the strips were removed. The metal chlorides were crushed into 0.25 to 0.5 inch pieces.

The strips were washed with 5% concentrated hydrochloric acid using agitation obtained by bubbling air through the mixture which oxidizes cuprous chloride to cupric chloride. The solution of metal chlorides was decanted from the mixture of gold and silver chloride and water washed. Silver chloride was dissolved by washing the solids with 26 Baume hydroxide. The remaining gold strips were washed briefly with 50/50 concentrated nitric acid/water. The strips were then washed with water and oven dried and analyzed.

The gold strips were porous, easily broken between fingers and showed some surface recrystallization. The lower ends of the strips showed channels where the chloride drained off. Some strips bent over under their own weight.

The metal chlorides were similarly washed and the gold fines therein separated, washed, dried and melted under a borax flux. After casting, the gold obtained was drilled for sampling.

|  | % Au | % Ag | % Cu | % Zn | dwt | % |
|---|---|---|---|---|---|---|
| Strips | 99.980 | .0155 | .0035 | .0009 | 1931.2 | 92.05 |
| Fines | 99.983 | .0015 | .0143 | .0008 | 166.8 | 7.95 |

EXAMPLE 2

A sample of 11.5K (approx.) red gold alloy scrap weighing 3586g. was suspended in the reactor described in Example 1. The alloy was chlorinated in a manner similar to Example 1. Chlorine was introduced into the reactor at 305 degrees Centigrade at 2.5 mmols/sec. in 15 minutes. The power was cut off at 428 degrees. The chlorine flow was advanced to 5.0 mmols/sec. at 50 minutes (temperature—528 degrees). At 1 hour 21 minutes into the run chlorine was increased to 10 mmols./- sec. (temperature—532 degrees). As the temperature peaked and started to decrease, power was applied to the heaters to hold the temperature above 500 degrees. Chlorine was increased to 12.5 mmols/sec. The temperature rose to 526 degrees at which time power to the heaters was shut off. Temperature peaked at 610 degrees. Chlorine flow was reduced to 8.75 mmols/sec. for 30 minutes and then increased to 12.5 mmols/sec. The temperature continued to fall until at 4 hours and 20 minutes into the run at a temperature of 526 degrees, power was applied for 4 minutes. The power was repeatedly applied and then discontinued until it became apparent that the chlorine contribution to the heat had materially decreased. Chlorine flow was then decreased and the applied power maintained the temperature. At five hours 10 minutes in the run, the power was cut off. Chlorine flow was adjusted to 0.63 mmols/sec. for an additional 40 minutes. The strips and molten chlorides were removed after the reactor had cooled and wash similar to the manner described in Example 1.

|  | % Au | % Ag | % Cu | % Zn | dwt | % |
|---|---|---|---|---|---|---|
| Strips | 99.991 | .0049 | .0034 | .0005 | 1535.2 | 87.9 |
| Fines | 99.813 | .0234 | .1626 | .0011 | 210.73 | 12.07 |

All of wash solutions were tested and showed no gold present.

EXAMPLE 3

A 10K yellow gold scrap sample (3588.3 dwt) was processed similarly to Example 1. The total time of chlorination was 5 hours 50 minutes. The temperature reached a maximum of 559 degrees Centigrade and was generally held at 530 degrees by controlling chlorine flow and power. A yield of 1500.1 dwt of gold having a fineness of 999.7 was obtained. The gold analyzed as follows:

|  | % Au | % Ag | % Cu | % Zn | dwt | % |
|---|---|---|---|---|---|---|
| Strips | 99.974 | 0.0247 | 0.0011 | .0000 | 1221.5 | 81.43 |
| Fines | 99.977 | 0.0055 | 0.0128 | .0043 | 278.6 | 18.57 |

We have found that it is preferable to either suspend the gold alloy strips vertically or stack the gold alloy strips vertically in the reactor in a manner which prevents adjacent strips from coming into contact with each other. When the strips touch each other, a welding action occurs which hinders the diffusion of chlorine into the gold strips at the point of contact resulting in a gold product having a lesser fineness than desired.

We claim:

1. A process for purifying a gold alloy comprising:
   (a) reacting the gold alloy with chlorine at a temperature less than about 700° C. to form a metallic gold/metal chloride mixture; and
   (b) washing the metallic gold/metal chloride mixture sequentially with air agitated hydrochloric acid and water to remove metal chlorides other than silver chloride from the mixture.
2. The process of claim 1 wherein the temperature is within the range of about 300° C. to about 700° C.
3. The process of claim 1 wherein the gold alloy is in the form of dore, scrap gold, old jewelry, or electronic scrap and is converted to at least about 99.9% pure gold.
4. The process of claim 1 wherein the gold alloy has a gold content of about 25% to 75% by weight and is in the form of thin strips.
5. The process of claim 4 wherein the strips have a thickness of 0.05 to 0.2 inches.
6. The process of claim 4 wherein the strips are disposed while being reacted with chloride in a manner which prevents contact between adjacent strips.
7. A process for purifying a silver-containing gold alloy comprising:
   (a) reacting the gold alloy with chlorine at a temperature with the range of about 300° C. to about 700° C. to form a mixture containing metallic gold, silver chloride, and other metal chlorides;
   (b) washing the mixture with air-sparged hydrochloric acid to dissolve the metal chlorides other than silver chloride forming a metallic gold/silver chloride mixture;
   (c) washing the metallic gold/silver chloride mixture with ammonium hydroxide to dissolve the silver chloride; and
   (d) washing the metallic gold with nitric acid to remove traces of metallic silver from the metallic gold and form 99.9% pure gold.
8. The process of claim 7 wherein the temperature is within the range of about 350° C. to about 650° C.
9. The process of claim 7 wherein the pure gold is at least 99.99% pure.
10. A process fur purifying a gold alloy containing alloying metal and silver, comprising:
    (a) reacting the gold alloy with chlorine at a temperature less than about 700° C. to form a metallic gold/metal chloride/silver chloride mixture;
    (b) washing the metallic gold/metal chloride/silver chloride mixture sequentially with air agitated hydrochloric acid and water to remove the metal chloride from the mixture and to produce a mixture of metallic gold and silver chloride;
    (c) washing the mixture of metallic gold/silver chloride with ammonium hydroxide to remove the silver chloride present.
11. A process for purifying a gold alloy containing alloying metal and silver comprising:
    (a) reacting the gold alloy with chlorine at a temperature less than about 700° C. to form a metallic gold/metal chloride/silver chloride/silver mixture;
    (b) washing the metallic gold/metal chloride/silver chloride/silver mixture sequentially with air agitated hydrochloric acid and water to remove the metal chloride from the mixture and produce a metallic gold/silver chloride/silver mixture;
    (c) washing the metallic gold/silver chloride/silver mixture with ammonium hydroxide to remove the silver chloride and produce a metallic gold/silver mixture;
    (d) washing the metallic gold/silver mixture with nitric acid to remove the metallic silver.

* * * * *